United States Patent
McCarty

(10) Patent No.: US 11,736,270 B2
(45) Date of Patent: Aug. 22, 2023

(54) ERROR AND ATTACK RESISTANT RANDOM NUMBER GENERATION USING QUANTUM COMPUTING

(71) Applicant: Accenture Global Solutions Limited, Dublin (IE)

(72) Inventor: Benjamin Glen McCarty, Washington, DC (US)

(73) Assignee: Accenture Global Solutions Limited, Dublin (IE)

( * ) Notice: Subject to any disclaimer, the term of this patent is extended or adjusted under 35 U.S.C. 154(b) by 391 days.

(21) Appl. No.: 17/141,897

(22) Filed: Jan. 5, 2021

(65) Prior Publication Data

US 2022/0216982 A1   Jul. 7, 2022

(51) Int. Cl.
*H04L 9/00* (2022.01)
*G06N 10/00* (2022.01)
*G06F 7/58* (2006.01)

(52) U.S. Cl.
CPC .......... *H04L 9/002* (2013.01); *G06N 10/00* (2019.01); *G06F 7/588* (2013.01); *H04L 2209/08* (2013.01)

(58) Field of Classification Search
CPC ..... H04L 9/002; H04L 9/0852; H04L 9/0869; H04L 2209/08; G06N 10/00; G06N 10/20; G06N 10/60; G06N 10/70; G06F 7/588
See application file for complete search history.

(56) References Cited

U.S. PATENT DOCUMENTS

| 2020/0372388 A1* | 11/2020 | Da Silva Júnior ...... G06N 5/04 |
| 2022/0100473 A1* | 3/2022 | Aaronson .............. G06N 10/80 |
| 2022/0188682 A1* | 6/2022 | van den Berg ........ G06N 10/70 |

OTHER PUBLICATIONS

Extended Search Report in European Appln. No. 22150143.0, dated Jun. 8, 2022, 11 pages.
Herrero-Collantes et al., "Quantum random numbers generators," Review of Modern Physics, Feb. 22, 2017, 89(1):015004, 48 pages.
Liu et al., "Reliability Modeling of NISQ-Era Quantum Computers," Presented at Proceedings of the 2020 IEEE International Symposium on Workload Characterization (IISWC), Beijing, China, Oct. 27-30, 2020, 12 pages.
Roffe, "Quantum Error Correction: An Introductory Guide," CoRR, submitted on Jul. 25, 2019, arXiv:1907.11157v1, 29 pages.
Bhattacharjee et al., "A Search for Good Pseudo-random Number Generators: Survey and Empirical Studies," arXiv, Nov. 3, 2018, arXiv:1811.04035v1, 54 pages.

(Continued)

*Primary Examiner* — Minh Dinh
(74) *Attorney, Agent, or Firm* — Fish & Richardson P.C.

(57) ABSTRACT

Methods, systems, and apparatus for quantum random number generation. In one aspect, a method includes initializing N qubits in respective superposition states; computing a randomly selected oracle randomization function using i) the initialized N qubits and ii) multiple ancilla qubits, wherein the multiple ancilla qubits comprise a first ancilla qubit and one or more second ancilla qubits; performing a phase flip operation on the first ancilla qubit; computing an inverse of the randomly selected oracle randomization function using i) the N qubits and ii) the multiple ancilla qubits; performing a diffusion operation on the N qubits; and measuring the N qubits and providing data representing the measured states of the N qubits as N random bits.

20 Claims, 12 Drawing Sheets

(56) References Cited

OTHER PUBLICATIONS

Francis et al., "Quantum random number generation using an on-chip plasmonic beamsplitter," arXiv, Aug. 4, 2017, arXiv:1610.06300v2, 8 pages.

Frigerio et al., "Random Numbers Spring from Alpha Decay," Technical Report, Argonne National Laboratory, May 1980, 65 pages.

Github.com [online], "How to use Quirk," last updated Sep. 15, 2020, retrieved on Feb. 19, 2021, retrieved from URL<https://github.com/Strilanc/Quirk/wiki/How-to-use-Quirk>, 11 pages.

Jennewein et al., "A Fast and Compact Quantum Random Number Generator," arXiv, Dec. 28, 1999, arXiv:quant-ph/9912118v1, 21 pages.

Pasqualini et al., "Pseudo Random Number Generation: a Reinforcement Learning approach," arXiv, Dec. 15, 2019, arXiv:1912.11531v1, 13 pages.

Tsurumaru et al., "Secure random number generation from parity symmetric radiations," arXiv, Dec. 19, 2019, arXiv:1912.09124v1, 8 pages.

Wikipedia.org [online], "Random number generator attack," last updated Nov. 27, 2020, retrieved on Feb. 19, 2021, retrieved from URL<https://en.wikipedia.org/wiki/Random_number_generator_attack>, 7 pages.

\* cited by examiner

Example Measured states and measurement results 900

ERROR AND ATTACK RESISTANT RANDOM NUMBER GENERATION USING QUANTUM COMPUTING

TECHNICAL FIELD

This specification relates to the fields of cryptography, computer security, and quantum computing.

BACKGROUND

Random number generation is a process performed by a random number generator that generates a sequence of numbers that cannot be reasonably predicted better than by a random chance.

Example random number generators include true hardware random-number generators. True hardware random number generators generate random numbers as a function of current value of some physical environment attribute that is constantly changing in a manner that is practically impossible to model. Other example random number generators include pseudo-random number generators. Pseudo-random number generators generate numbers that look random, but are actually deterministic, and can be reproduced if the state of the pseudo random number generator is known.

SUMMARY

This specification describes systems, methods, devices and other techniques for error and attack resistant quantum random number generation.

In general, one innovative aspect of the subject matter described in this specification can be implemented in a method that includes initializing N qubits in respective superposition states; computing a randomly selected oracle randomization function using i) the initialized N qubits and ii) multiple ancilla qubits, wherein the multiple ancilla qubits comprise a first ancilla qubit and one or more second ancilla qubits; performing a phase flip operation on the first ancilla qubit; computing an inverse of the randomly selected oracle randomization function using i) the N qubits and ii) the multiple ancilla qubits; performing a diffusion operation on the N qubits; and measuring the N qubits and providing data representing the measured states of the N qubits as N random bits.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the method further includes measuring the multiple ancilla qubits to obtain respective measurement results; and classically post processing the measurement results, comprising: determining whether i) a measured state of the first ancilla qubit comprises an on state and ii) measured states of the second ancilla qubits each comprise an off state; and in response to determining that i) a measured state of the first ancilla qubit comprises an on state and ii) measured states of the other ancilla qubits each comprise an off state, providing the data representing the measured states of the N qubits as N random bits.

In some implementations the method further includes repeatedly: initializing the N qubits in respective superposition states, computing a randomly selected oracle randomization function, performing a phase flip operation on the first ancilla qubit, computing an inverse of the randomly selected oracle randomization function, and measuring the N qubits and ancilla qubits to obtain measurement statistics for the N qubits and the multiple ancilla qubits; and classically post processing the measurement statistics, comprising: determining whether i) each measured state of the first ancilla qubit comprises an on state, ii) each measured state of the second ancilla qubits comprises an off state, and iii) the measurement outcomes of the N qubits match an expected probability distribution of the oracle randomization function; and in response to determining that i) each measured state of the first ancilla qubit comprises an on state, ii) each measured state of the other ancilla qubits comprises an off state, and iii) measurement outcomes of the N qubits match an expected probability distribution of the oracle randomization function, providing i) data representing measured states of the N qubits for one repetition as N random bits or ii) generating a random N bit output by performing randomness extraction on the measurement statistics.

In some implementations performing randomness extraction on the measurement statistics comprises computing inner products of randomization qubit measurement results over pairs of output states for different repetitions.

In some implementations the superposition states comprise uniform superposition states, e.g., $|+\rangle$, $|-\rangle$, $|i\rangle$, or $|-i\rangle$ states.

In some implementations the superposition states comprise a balanced distribution of superposition states.

In some implementations initializing the N qubits in respective superposition states comprises initializing one or more qubits in a $-i$ state, wherein initializing a qubit in a $-i$ state comprises: preparing the qubit in a zero computational state; and applying a sequence of quantum logic gates to the qubit in the zero computational state, the sequence of quantum logic gates comprising a first Hadamard gate, a X gate, a second Hadamard gate, a first inverse S gate, a third Hadamard gate and a second inverse S gate.

In some implementations initializing the N qubits in respective superposition states comprises initializing one or more qubits in an i state, wherein initializing a qubit in an i state comprises: preparing the qubit in a zero computational state; and applying a sequence of quantum logic gates to the qubit in the zero computational state, the sequence of quantum logic gates comprising a first inverse S gate, a first Hadamard gate, a second inverse S gate, a second Hadamard gate, a X gate and a third Hadamard gate.

In some implementations the method further comprises implementing an error correction routine on the N qubits using one or more ancilla qubits.

In some implementations i) the oracle randomization function prepares the N-qubits in a mixed quantum state and ii) measuring the mixed quantum state outputs multiple pure quantum states according to an associated expected probability distribution.

In some implementations the method further comprises randomly selecting the oracle randomization function from a set of multiple oracle randomization functions, wherein i) each oracle randomization function in the set of multiple oracle randomization functions prepares the N-qubits in a respective mixed quantum state and ii) measuring each mixed quantum state outputs multiple pure quantum states according to a respective expected probability distribution.

In some implementations the set of multiple oracle randomization functions excludes oracle randomization functions that prepare each of the N-qubits in a 0 quantum state or each of the N-qubits in a 1 quantum state.

In some implementations the oracle randomization function comprises:

multiple CX gates, wherein i) each CX gate targets a respective second ancilla qubit, ii) two of the N qubits act as controls for each CX gate, and iii) each of the N qubits acts as a control for two respective CX gates, wherein a first control comprises a conditional-on control and a second control comprises a conditional-off control; and a CX gate targeting the first ancilla qubit, wherein i) each second ancilla qubit acts as a control for the CX gate and ii) the controls for the CX gate comprise conditional-off controls.

In some implementations computing the randomly selected oracle randomization function using i) the initialized N qubits and ii) the multiple ancilla qubits comprises: applying, conditioned on a first qubit of the N qubits being in a zero state and a fourth qubit of the N qubits being in a zero state, a first X gate to a first qubit of the one or more second ancilla qubits; applying, conditioned on a second qubit of the N qubits being in a one state and a third qubit of the N qubits being in a one state, a second X gate to a second qubit of the one or more second ancilla qubits; applying, conditioned on the first qubit of the N qubits being in a one state and the fourth qubit of the N qubits being in a one state, a third X gate to a third qubit of the one or more second ancilla qubits; applying, conditioned on the second qubit of the N qubits being in a zero state and the third qubit of the N qubits being in a zero state, a fourth X gate to a fourth qubit of the one or more second ancilla qubits; and applying, conditioned on each of the first, second, third and fourth qubits of the N qubits being in a one state, a fifth X gate to the first ancilla qubit.

In some implementations performing the phase flip operation on the first ancilla qubit comprises applying a Z gate to the first ancilla qubit.

In some implementations performing the diffusion operation on the N qubits negates the initialization of the N qubits in the respective superposition states.

In some implementations initializing the N qubits in respective superposition states comprises applying respective sequences of quantum gates to the N qubits, and wherein performing the diffusion operation on the N qubits comprises: applying a Z gate to each of the N qubits; applying the respective sequences of quantum gates to the N qubits; applying a Z gate to one of the N qubits, wherein the Z gate is conditioned on each other qubit in the N qubits being in a zero state; applying the respective sequences of quantum gates to the N qubits; and applying a Z gate to each of the N qubits.

In some implementations the method further comprises repeatedly i) computing a randomly selected oracle randomization function using the initialized N qubits and multiple ancilla qubits, ii) performing a phase flip operation on the first ancilla qubit, iii) computing an inverse of the randomly selected oracle randomization function using the N qubits and the multiple ancilla qubits, and iv) performing a diffusion operation on the N qubits for a predetermined number of times, wherein the predetermined number of times comprises an integer part of $\sqrt{N}$.

In some implementations the method further comprises repeatedly i) initializing the N qubits in respective superposition states, ii) computing a randomly selected oracle randomization function, iii) performing a phase flip operation on the first ancilla qubit, iv) computing an inverse of the randomly selected oracle randomization function, v) performing a diffusion operation on the N qubits, and vi) measuring the N qubits and providing data representing the measured states of the N qubits as N random bits, to output a stream of random bits.

The subject matter described in this specification can be implemented in particular ways so as to realize one or more of the following advantages.

While pseudo-random number generators can efficiently generate random numbers, algorithms implemented by the pseudo-random number generators are deterministic and not truly random. In addition, the algorithms are vulnerable to different types of attacks, e.g., if a seed and the algorithm are known, a hacker can predict generated random numbers. Hardware-random number generators can generate true random numbers with full entropy, but cannot efficiently generate large amounts of random numbers on demand. In addition, hardware-random number generators are vulnerable to physical tampering.

The presently described techniques overcome these deficiencies. A system implementing the presently described techniques implements quantum computing operations that amplify qubit randomness to generate sequences of true random bits. In addition, since gate-based quantum computers can quickly perform gate operations, e.g., every 6 picoseconds of a qubit on demand, a system implementing the presently described techniques can efficiently generate fast streams of truly random bits on demand, e.g., 1 billion random bits per second (assuming no artificial throttling of circuit execution per second, no needed hidden/extra gate operations such as swap gates or decoupling gates and no faults/errors running at a theoretical maximum full speed of 6 picoseconds per gate). In addition, the presently described techniques include an error detection mechanism that enables a system to detect errors or tampering and therefore discard outputs that are not truly random.

The presently described techniques also overcome deficiencies associated with known quantum random number generators or random number generation methods. For example, Hadamard gate based superposition quantum random number generation has a systematic bias which can reduce entropy, does not use uniform superposition basis states, e.g., uses a |+⟩ basis on the X axis, has no checks for stochastic errors, e.g., unintended environmental noise can influence randomness, and does not provide integrity checks for attacks or other sources of compromise. Conversely, the presently described techniques are not subject to systematic biases, are based on balanced distributions of symmetrically uniform superposition states, and provide error and integrity checks.

As another example, hardware-based quantum random number generators such as beam splitters or radioactive decay systems can be physically tampered with, cannot always generate a constant stream of random bits on demand, e.g., can incur delays while waiting to measure cosmic background noise, and require expensive, special-purpose hardware. Conversely, the presently described techniques can detect tampering, can efficiently generate a constant stream of random bits on demand, can be implemented by standard gate model quantum computers, e.g., NISQ devices, and require only universal, elementary, and/or Clifford-group gates, e.g., no expensive gates such as T gates are required.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
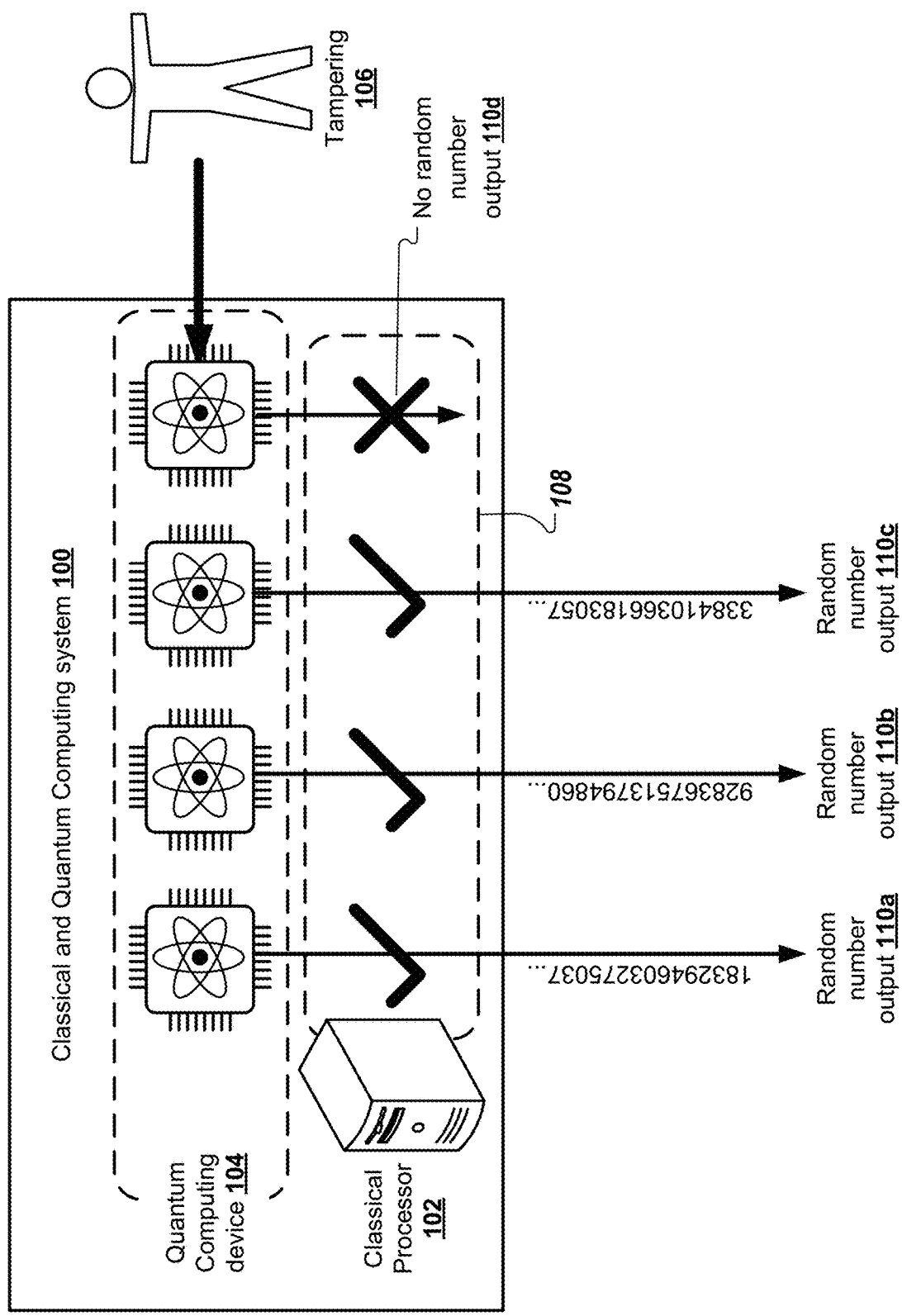
FIG. 1 shows a conceptual block diagram of an example system for quantum random number generation.

FIG. 1 shows a conceptual block diagram of an example classical and quantum computing system 100 for quantum random number generation. The example system 100 includes a classical processor 102 and quantum computing device 104. The classical processor 102 and quantum computing device 104 can exchange electronic communications over one or more networks, or can exchange communications in another way, such as over one or more wired or wireless connections.

The classical processor 102 is configured to perform classical computations. The quantum computing device 104 is configured to perform quantum computations. For convenience, the classical processor 102 and quantum computing device 104 are illustrated as separate entities. However, in some implementations the classical processor 102 can be included in the quantum computing device 104. That is, the quantum computing device 104 can include components for performing classical computing operations. Generally, the classical computing components included in example system 100 can be implemented as one or more classical computers having physical hardware like that described with respect to FIG. 12 and the quantum computing components of the example system 100 can be implemented as quantum computing devices having physical hardware like that described with respect to FIG. 11.

The example system 100 is configured to generate random numbers as output, e.g., random number outputs 110a-110c. To generate a random number output, the example system 100 prepares a register of randomization qubits in a balanced distribution of uniform superposition states. The example system 100 also prepares a register of ancilla qubits in respective initial states. The system then applies a quantum circuit to the prepared register of randomization qubits and prepared register of ancilla qubits. Application of the quantum circuit computes and uncomputes a quantum oracle randomization function which amplifies the randomness of the randomization qubits. To increase security of the random number generation process, each time the system generates a random number the system can randomly select a quantum oracle randomization function from a set of suitable quantum oracle randomization functions. Application of the quantum circuit also performs a diffusion operation which negates the preparation of the register of randomization qubits in the superposition states. Example quantum circuits—including example oracle randomization functions and example diffusion operations—implemented by example system 100, are described below with reference to FIGS. 2 to 10.

By construction, application of the quantum circuit causes the randomization qubits to evolve to pure random quantum states. Therefore, after application of the quantum circuit, the system can then measure the randomization qubits to obtain a sequence of pure random bits. The system can directly output the sequence of random bits or output a decimal number represented by the sequence of random bits, e.g., random number outputs 110a-110c.

In addition, by construction, application of the quantum circuit provides an error detection mechanism which enables the system to determine whether an error or malicious tampering 106 occurred during the random number generation process. For example, after application of the quantum circuit the system can also measure the ancilla qubits. If the measured states of the ancilla qubits match expected measurement results, the system can determine that no errors occurred. In addition, the system can repeatedly prepare the qubit registers, apply the quantum circuit and measure the qubit registers to obtain measurement statistics. If the measurement statistics match expected probability distributions, the system can determine that no errors or tampering occurred. In either example, if an error or tampering is detected, the system can discard the sequence of random bits and no random number is output 110d. Example operations performed by the example system 100, including example post processing of measurement results and/or statistics, are described below with reference to FIGS. 2 to 10.

Figure 2:
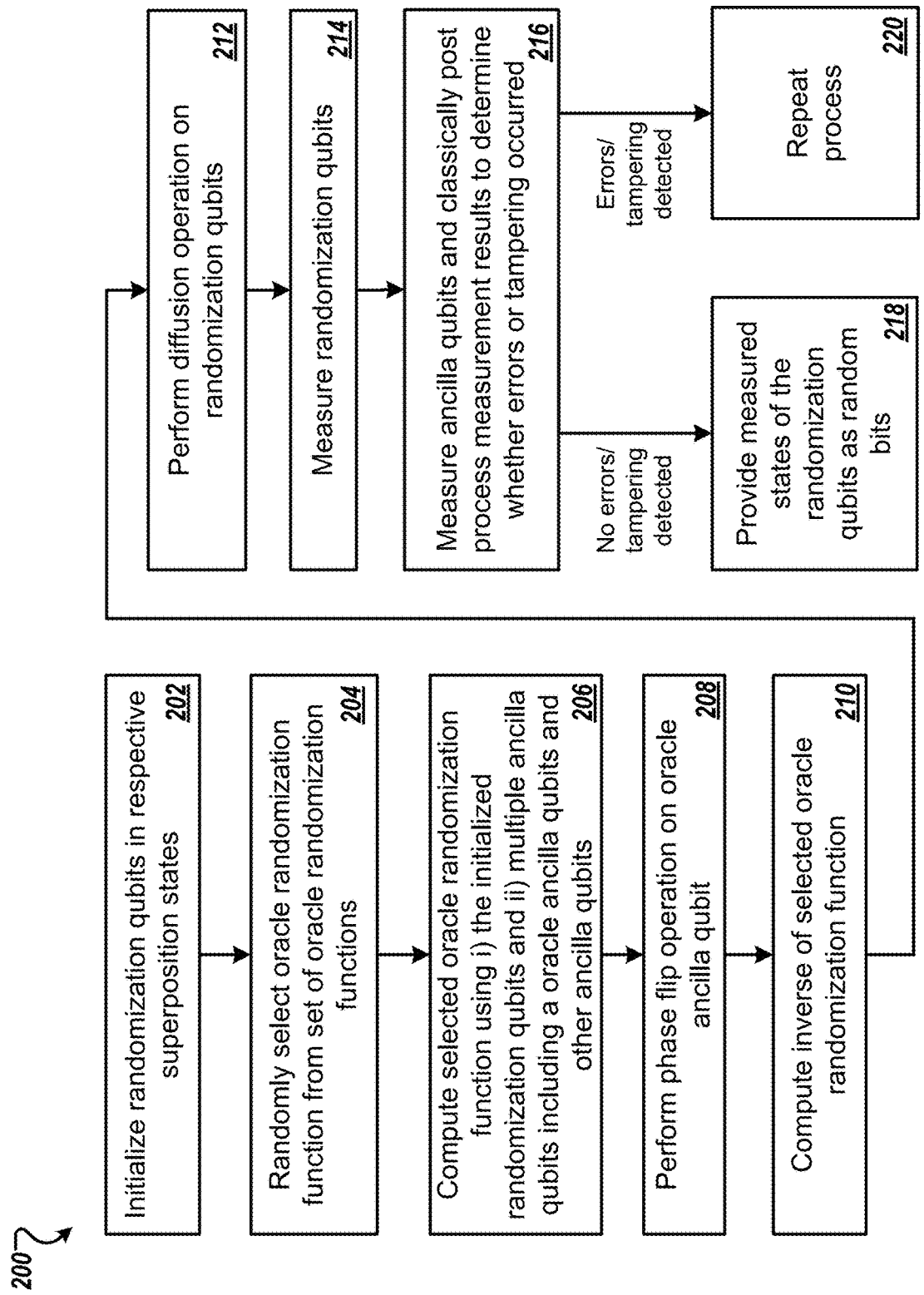
FIG. 2 is a flow diagram of an example process for generating random bits using quantum computation.

FIG. 2 is a flowchart of an example process 200 for generating random bits using quantum computation. For convenience, the process 200 will be described as being performed by a system that includes one or more classical and quantum computing devices located in one or more locations. For example, system 100 of FIG. 1, appropriately programmed in accordance with this specification, can perform the process 200.

The system initializes N qubits (referred to herein as randomization qubits) in respective superposition states (step 202). The superposition states can include uniform superposition states, e.g., linear combinations of equally weighted (in terms of magnitude) quantum states. Example uniform superposition states include $|+\rangle$ $|-\rangle$, $|i\rangle$ or $|-i\rangle$ quantum states. The N qubits can be initialized in a balanced distribution of superposition states. For example, the superposition states can include complementary superposition states, e.g., all basis superposition states from a corresponding set of basis states such as $\{|+\rangle, |-\rangle\}$ or $\{|i\rangle, |-i\rangle\}$.

To initialize a qubit in a respective superposition state, the system can apply a quantum circuit including one or more quantum logic gates to the qubit. For example, to initialize a qubit in a $-i$ state the system can prepare or obtain the qubit in a zero computational basis state and apply a sequence of quantum logic gates to the qubit in the zero computational basis state. In some implementations the sequence of quantum logic gates can include a first Hadamard gate, an X gate, a second Hadamard gate, a first inverse S gate, a third Hadamard gate and a second inverse S gate. As another example, to initialize a qubit in an i state the system can prepare or obtain the qubit in a zero computational basis state and apply a sequence of quantum logic gates to the qubit in the zero computational basis state. In some implementations the sequence of quantum logic gates can include a first inverse S gate, a first Hadamard gate, a second inverse S gate, a second Hadamard gate, a X gate and a third Hadamard gate. An example quantum circuit for initializing 4 randomization qubits in respective superposition states is described below with reference to FIG. 3.

In some implementations the system can further implement an error correction routine on the N qubits using additional ancilla qubits, e.g., a parity bit check or a phase flip bit check. In some implementations a full set of error-correcting codes, e.g., Shor's 9 qubit error-correcting code, may not be required since the ancilla qubits and oracle ancilla qubit are already detecting errors/faults. Therefore in some cases only 2 error ancilla qubits (1 parity and 1 phase) can be applied to the first random qubit to maintain true random integrity during execution.

The system randomly selects an oracle randomization function (step 204). The oracle randomization function is a function that can be applied to N randomization qubits and multiple ancilla qubits, where the multiple ancilla qubits includes a first ancilla qubit (also referred to herein as an oracle ancilla qubit) and one or more second ancilla qubits (also referred to herein as ancilla qubits or other ancilla qubits). Application of the oracle randomization function to the N randomization qubits, oracle ancilla qubit and other ancilla qubits, prepares the N randomization qubits in a mixed quantum state. The mixed quantum state is a state which, when measured, outputs a pure quantum state according to an associated expected probability distribution. For example, as described in more detail below with reference to FIG. 4, one example oracle randomization function applied to four randomization qubits can prepare a mixed quantum state which, when measured, outputs the pure quantum states $|0011\rangle$, $|0101\rangle$, $|1010\rangle$, $|1100\rangle$ with equal probability, i.e., each pure quantum state has a measurement probability of 25%. In some implementations oracle randomization function that output the pure quantum states $|0000\rangle$ or $|1111\rangle$ can be avoided, e.g., not included in the set of oracle randomization functions from which the system randomly selects one oracle randomization function, to improve robustness against errors or attacks. For example, suppose an adversary had unauthorized access to the quantum system. If the adversary could cause 90 microseconds of delay into the quantum program before measurement, the random qubits could be more likely to suffer energy relaxation from idling for too long. This could cause the random qubits to return to a $|0000\rangle$ state. In addition, if an adversary had the ability to inject extra energy into a quantum system, the adversary could force the random qubits into the $|1111\rangle$ excited state. In quantum systems with qubits that can occupy states outside of the computational subspace, e.g., d-level quantum systems, the adversary could overload the qubit to enter excited quantum states (outside of the computational subspace) which could be measured as a $|1111\rangle$.

The oracle randomization function can include multiple CX gates (controlled-X gates). Each CX gate targets a respective second ancilla qubit. In addition, two of the N randomization qubits act as controls for each CX gate. Further, each of the N randomization qubits can act as a control for two respective CX gates, where one control is a conditional-on control and the other control is a conditional-off control. Example oracle randomization function controls are described below with reference to FIG. 5. The oracle randomization function further includes a CX gate targeting the oracle ancilla qubit, where each second ancilla qubit acts as a control for the CX gate and the controls for the CX gate are conditional-off controls.

The system can select the oracle randomization function from a set of multiple oracle randomization functions, e.g., multiple oracle randomization functions that have the properties and structure described above. For example, the set of multiple oracle randomization functions can include oracle randomization functions with the control patterns 502-512, as described below with reference to FIG. 5.

The system computes the randomly selected oracle randomization function using the initialized N qubits, oracle ancilla qubit and one or more other ancilla qubits (step 206). Computing the randomly selected oracle randomization function includes applying a quantum circuit to the initialized N qubits, oracle ancilla qubit and other ancilla qubits. For example, when the system selects the oracle randomization function represented by the quantum circuit 400 of FIG. 4, the system can apply, conditioned on a first randomization qubit being in a zero state and a fourth randomization qubit being in a zero state, a first X gate to an oracle ancilla qubit. The system can also apply, conditioned on a second randomization qubit being in a one state and a third randomization qubit being in a one state, a second X gate to a second ancilla qubit. The system can also apply, conditioned on the first randomization qubit being in a one state and the fourth randomization qubit being in a one state, a third X gate to a third ancilla qubit. The system can also apply, conditioned on the second randomization qubit being in a zero state and the third randomization qubit being in a zero state, a fourth X gate to a fourth ancilla qubit. The system can also apply, conditioned on each of the randomization qubits being in a one state, a fifth X gate to the oracle ancilla qubit.

The system performs a phase flip operation on the oracle ancilla qubit (step 208). Performing the phase flip operation on the oracle ancilla qubit includes applying a Z gate to the oracle ancilla qubit.

Figure 4:
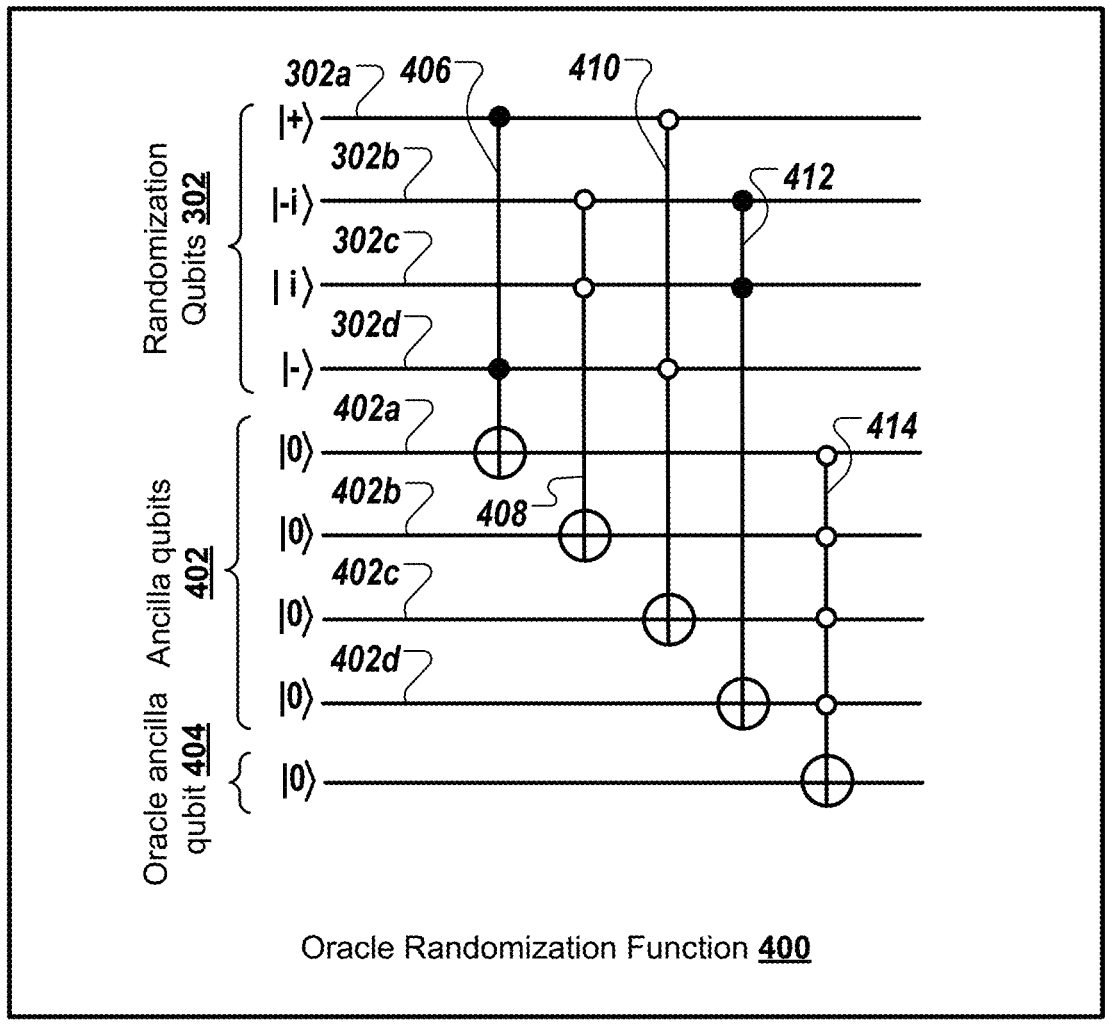
FIG. 4 shows an example quantum circuit for performing an oracle randomization function.

The system computes an inverse of the randomly selected oracle randomization function using the N randomization qubits, the oracle ancilla qubit and the other ancilla qubits (step 210). An example quantum circuit for computing an inverse of the oracle function computed via application of quantum circuit 400 of FIG. 4 is described below with reference to FIG. 6.

The system performs a diffusion operation on the N qubits (step 212). The diffusion operation negates the initialization of the N randomization qubits in the respective superposition basis states at step 202. Therefore, the diffusion operation performed by the system is dependent on operations performed during the initialization of the N randomization qubits. For example, as described above with reference to step 202, initializing the N randomization qubits in respective superposition basis states can include applying respective sequences of quantum gates to the N randomization qubits. Therefore, to perform the diffusion operation on the N randomization qubits the system can apply a Z gate to each of the N qubits. The system can then apply the respective sequences of quantum gates to the N randomization qubits. The system can then apply a CZ gate to one of the N randomization qubits, where the Z gate is conditioned on each other qubit in the N randomization qubits being in a zero state. The system can then apply the respective sequences of quantum gates to the N qubits. The system can then apply a Z gate to each of the N randomization qubits. An example quantum circuit for performing a diffusion operation on four randomization qubits is described below with reference to FIG. 7.

In some implementations the system can repeatedly perform steps 206-212. For example, the system can perform steps 206-212 multiple times prior to step 216 or 218 below. The number of times can be dependent on the number of randomization qubits being used, e.g., the system can repeatedly perform the steps $\sqrt{N}$ times where N represents the number of randomization qubits.

The system measures i) the N randomization qubits to obtain data representing measured states of the N randomization qubits (step 214). The qubits can be measured in the Z-basis. The system can then output the data representing the measured states of the N randomization qubits as N random bits, where the N random bits can be used as a binary representation of a corresponding decimal random number (step 218).

Alternatively, the system can further measure the multiple ancilla qubits to obtain respective measurement results and classically post process the measurement results to verify the generated random bits by determining whether an error or tampering occurred during the random number generation process (step 216).

For example, in some implementations the system can determine whether i) the measured state of the oracle ancilla qubit is an on state and ii) the measured states of the other ancilla qubits are each off states. In response to determining that the measured state of the oracle ancilla qubit is an on state and the measured states of the other ancilla qubits are each off states, the system can determine that no error or tampering occurred and output data representing the measured states of the N randomization qubits as N random bits (step 218). In response to determining that the measured state of the oracle ancilla qubit is not an on state and the measured states of the other ancilla qubits are not all off states, the system can determine that an error or tampering occurred and not output data representing the measured states of the N qubits.

In some implementations the system can also repeat steps 202, 206-216 to obtain measurement statistics for the N randomization qubits and ancilla qubits. The system can then use the measurement statistics to determine whether an error or tampering occurred during the random number generation process. For example, the system can determine whether the measurement statistics show that the oracle ancilla qubit was always measured in an on state and whether the other ancilla qubits were always measured in off states. The system can further determine whether measurement outcomes of the N randomization qubits match an expected probability distribution of the oracle randomization function. For example, for the example oracle randomization function described below with reference to FIG. 4, the system can determine whether the measured states of the randomization qubits include the pure quantum states $|0011\rangle$, $|0101\rangle$, $|1010\rangle$ and $|1100\rangle$ with equal probability. Example measured states and statistical measurement results are described below with reference to FIG. 9.

In response to determining that i) the oracle ancilla qubit was always measured in an on state, ii) the other ancilla qubits were always measured in an off state, and iii) measured states of the N randomization qubits match an expected probability distribution of the oracle randomization function, the system can generate a random N bit output (step 218). For example, the system can output randomization qubit measurement results from one of the repetitions of steps 202, 206-216, e.g., a most recent repetition. Alternatively, the system can generate a random N bit output by performing randomness extraction on the measurement statistics. For example, the system can compute inner products of randomization qubit measurement results over pairs of output states for different repetitions, e.g., the measured randomization qubit states $|0011\rangle$ and $|0101\rangle$ can be mapped to the random bit "0".

In some implementations the system can use any of the above described random bit outputs to perform subsequent computations, e.g., security key generation, data encryption, multi-factor authentication or other high entropy applications. Alternatively or in addition, the system can provide the outputs to an external system for processing by the external system.

In some implementations example process 200 can be repeatedly performed to output a stream of random bits. In these implementations, a new oracle randomization function could be selected at each repetition to increase randomness. Alternatively, a same oracle randomization function could be used to generate a faster random stream.

Figure 3:
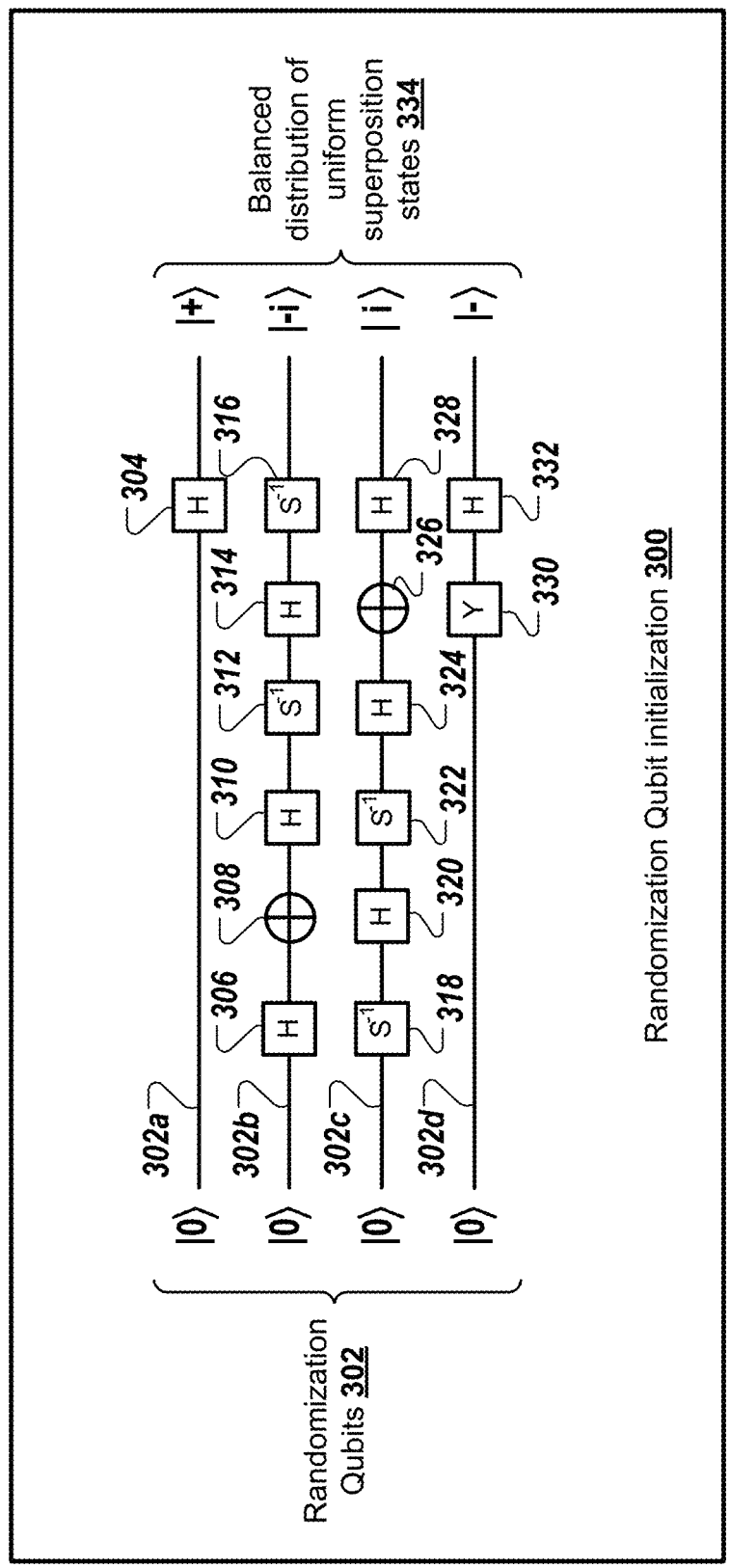
FIG. 3 shows an example quantum circuit for initializing randomization qubits in a balanced distribution of uniform superposition states.

FIG. 3 shows an example quantum circuit 300 for initializing N=4 randomization qubits 302 in a balanced distribution of uniform superposition states 334. The example quantum circuit 300 operates on four randomization qubits 302a, 302b, 302c and 302d. In this example each of the randomization qubits 302a, 302b, 302c, and 302d are prepared in a zero state $|0\rangle$.

The example quantum circuit 300 includes a Hadamard gate 304 that is applied to the first randomization qubit 302a. Application of the Hadamard gate 304 to the first randomization qubit 302a puts the qubit 302a in a $|+\rangle$ state.

The example quantum circuit 300 includes a Hadamard gate 306, a X gate (also referred to as NOT gate) 308, a Hadamard gate 310, an inverse S gate 312, a Hadamard gate 314 and an inverse S gate 316 which are applied to the second randomization qubit 302b. Application of the gates 306-316 put the qubit 302b in a $|-i\rangle$ state.

The example quantum circuit 300 includes an inverse S gate 318, a Hadamard gate 320, a inverse S gate 322, a Hadamard gate 324, a X gate 326 and a Hadamard gate 328 which are applied to the third randomization qubit 302c. Application of the gates 318-328 put the qubit 302c in an $|i\rangle$ state.

The example quantum circuit 300 includes a Y gate 330 and a Hadamard gate 332 which are applied to the fourth randomization qubit 302d. Application of the gates 330 and 332 put the qubit 302d in a $|-\rangle$ state. Therefore, after application of example quantum circuit 300 to the four randomization qubits 302a, 302b, 302c and 302d prepared in zero states, the four randomization qubits 302a, 302b, 302c and 302d are initialized in a balanced distribution of uniform superposition states 334.

FIG. 4 shows an example quantum circuit 400 for computing an oracle randomization function. The example quantum circuit 400 operates on four randomization qubits 302a, 302b, 302c and 302d, four ancilla qubits 402 and an oracle ancilla qubit 404. In this example each of the randomization qubits 302a, 302b, 302c, and 302d are initialized in the superposition states |+⟩, |−i⟩, |i⟩, and |−⟩, e.g., via application of quantum circuit 300 of FIG. 3, and the multiple ancilla qubits 402 and oracle ancilla qubit are prepared in a zero state |0⟩.

The example quantum circuit 400 includes a first CX gate 406 that targets an oracle ancilla qubit 402a. The first randomization qubit 302a and fourth randomization qubit 302d act as conditional-on controls for the CX gate 406 (where on-controls are indicated by the solid black circles on respective qubits, and the controls and target qubits for each conditional quantum gate are connected by a vertical line), i.e., the CX gate 406 is applied to the oracle ancilla qubit 402a if the first randomization qubit 302a and fourth randomization qubit 302a are in a zero state.

The example quantum circuit 400 further includes a second CX gate 408 that targets a second ancilla qubit 402b. The second randomization qubit 302b and third randomization qubit 302c act as conditional-off controls for the CX gate 408 (where off-controls are indicated by the white circles on respective qubits), i.e., the CX gate 408 is applied to the second ancilla qubit 402b if the second randomization qubit 302b and third randomization qubit 302b are in a one state. In some implementations the circuit may implement a conditional-off control by performing: a first X gate, a conditional-on control, and a second X gate on the control qubit.

The example quantum circuit 400 further includes a third CX gate 410 that targets a third ancilla qubit 402c. The first randomization qubit 302a and fourth randomization qubit 302d act as conditional-off controls for the CX gate 410.

The example quantum circuit 400 further includes a fourth CX gate 412 that targets a fourth ancilla qubit 402d. The second randomization qubit 302b and third randomization qubit 302c act as conditional-on controls for the CX gate 412.

The example quantum circuit 400 further includes a fifth CX gate 414 that targets the oracle ancilla qubit 404. Each of the ancilla qubits 402a-402d act as conditional-off controls for the CX gate 414.

Figure 5:
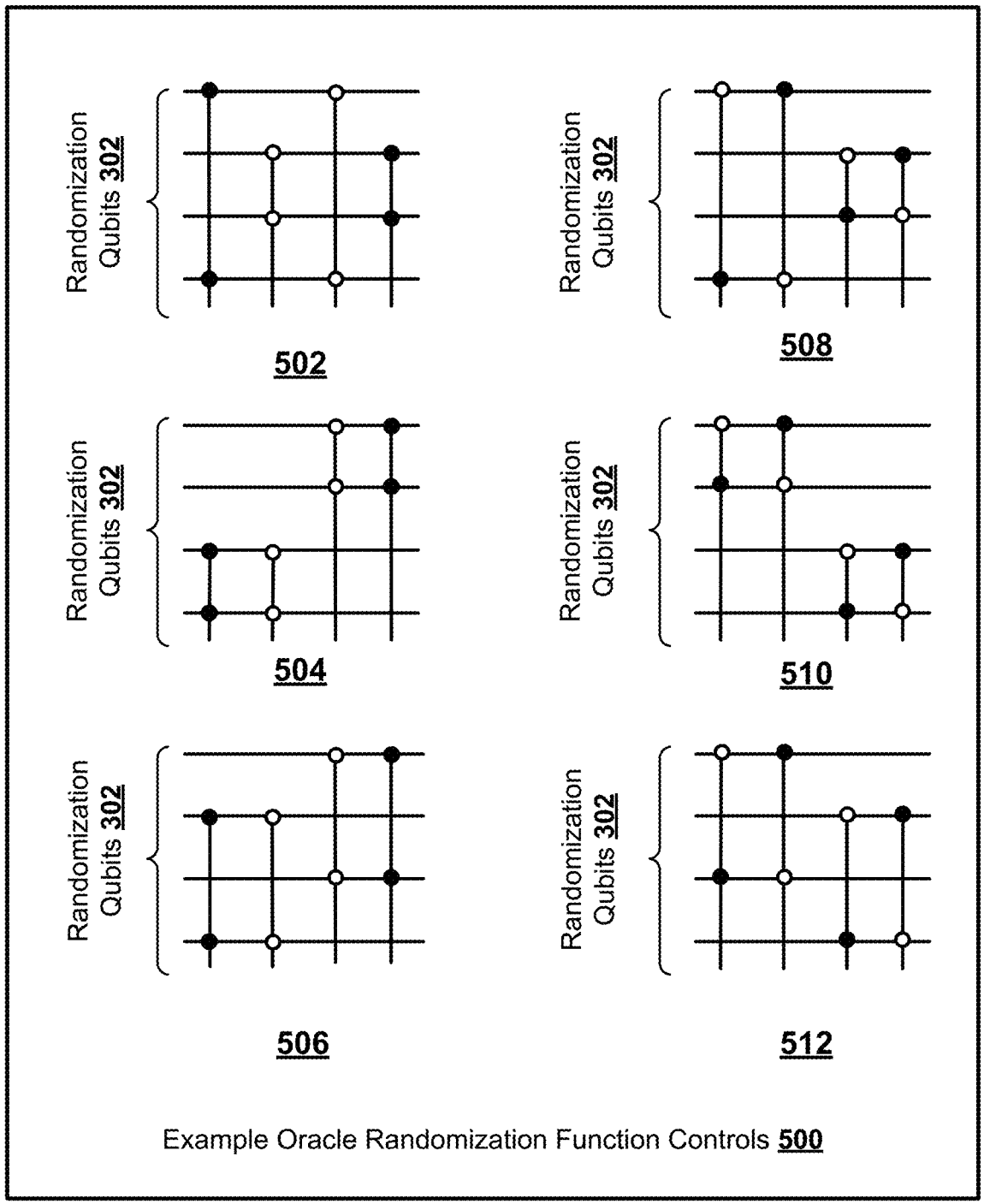
FIG. 5 shows example oracle randomization function controls.

FIG. 5 shows example oracle randomization function controls 500 for the multiple CX gates included in each oracle randomization function. As described above with reference to step 204 of FIG. 2, two randomization qubits act as controls for each of the multiple CX gates. Further, each randomization qubits acts as a control for two respective CX gates, where one control is a conditional-on control and the other control is a conditional-off control.

For example, in control pattern 502 the first randomization qubit and fourth randomization qubit act as controls for the first CX gate, where both controls are conditional-on controls. The second randomization qubit and third randomization qubit act as controls for the second CX gate, where both controls are conditional-off controls. The first randomization qubit and fourth randomization qubit act as controls for the third CX gate, where both controls are conditional-off controls. The second randomization qubit and third randomization qubit act as controls for the fourth CX gate, where both controls are conditional-on controls. In other words, the first randomization qubit acts as a control for the first and third CX gate, where one control is a conditional-on control and the other control is a conditional-off control. The second randomization qubit acts as a control for the second and fourth CX gate, where one control is a conditional-on control and the other control is a conditional-off control. The third randomization qubit acts as a control for the second and fourth CX gate, where one control is a conditional-on control and the other control is a conditional-off control. The fourth randomization qubit acts as a control for the first and third CX gate, where one control is a conditional-on control and the other control is a conditional-off control.

As another example, in control pattern 504, the third randomization qubit and fourth randomization qubit act as controls for the first CX gate, where both controls are conditional-on controls. The third randomization qubit and fourth randomization qubit act as controls for the second CX gate, where both controls are conditional-off controls. The first randomization qubit and second randomization qubit act as controls for the third CX gate, where both controls are conditional-off controls. The first randomization qubit and second randomization qubit act as controls for the fourth CX gate, where both controls are conditional-on controls. In other words, the first randomization qubit acts as a control for the third and fourth CX gate, where one control is a conditional-on control and the other control is a conditional-off control. The second randomization qubit acts as a control for the third and fourth CX gate, where one control is a conditional-on control and the other control is a conditional-off control. The third randomization qubit acts as a control for the third and fourth CX gate, where one control is a conditional-on control and the other control is a conditional-off control. The fourth randomization qubit acts as a control for the third and third CX gate, where one control is a conditional-on control and the other control is a conditional-off control.

As another example, in control pattern 506, the second randomization qubit and fourth randomization qubit act as controls for the first CX gate, where both controls are conditional-on controls. The second randomization qubit and fourth randomization qubit act as controls for the second CX gate, where both controls are conditional-off controls. The first randomization qubit and third randomization qubit act as controls for the third CX gate, where both controls are conditional-off controls. The first randomization qubit and third randomization qubit act as controls for the fourth CX gate, where both controls are conditional-on controls. In other words, the first randomization qubit acts as a control for the third and fourth CX gate, where one control is a conditional-on control and the other control is a conditional-off control. The second randomization qubit acts as a control for the first and second CX gate, where one control is a conditional-on control and the other control is a conditional-off control. The third randomization qubit acts as a control for the first and second CX gate, where one control is a conditional-on control and the other control is a conditional-off control. The fourth randomization qubit acts as a control for the first and second CX gate, where one control is a conditional-on control and the other control is a conditional-off control.

As another example, in control pattern 508, the first randomization qubit and fourth randomization qubit act as controls for the first CX gate, where the first randomization qubit is a conditional-off control and the fourth randomization qubit is a conditional-on control. The first randomization qubit and fourth randomization qubit act as controls for the second CX gate, where the first randomization qubit is a conditional-on control and the fourth randomization qubit is a conditional-off control. The second randomization qubit and third randomization qubit act as controls for the third CX gate, where the second randomization qubit is a conditional-off control and the third randomization qubit is a conditional-on control. The second randomization qubit and third randomization qubit act as controls for the fourth CX gate, where the second randomization qubit is a conditional-on control and the third randomization qubit is a conditional-off control. In other words, the first randomization qubit acts as a control for the first and second CX gate, where one control is a conditional-on control and the other control is a conditional-off control. The second randomization qubit acts as a control for the third and fourth CX gate, where one control is a conditional-on control and the other control is a conditional-off control. The third randomization qubit acts as a control for the third and fourth CX gate, where one control is a conditional-on control and the other control is a conditional-off control. The fourth randomization qubit acts as a control for the first and second CX gate, where one control is a conditional-on control and the other control is a conditional-off control.

As another example, in control pattern 510, the first randomization qubit and second randomization qubit act as controls for the first CX gate, where the first randomization qubit is a conditional-off control and the second randomization qubit is a conditional-on control. The first randomization qubit and second randomization qubit act as controls for the second CX gate, where the first randomization qubit is a conditional-on control and the second randomization qubit is a conditional-off control. The third randomization qubit and fourth randomization qubit act as controls for the third CX gate, where the third randomization qubit is a conditional-off control and the fourth randomization qubit is a conditional-on control. The third randomization qubit and fourth randomization qubit act as controls for the fourth CX gate, where the third randomization qubit is a conditional-on control and the fourth randomization qubit is a conditional-off control. In other words, the first randomization qubit acts as a control for the first and second CX gate, where one control is a conditional-on control and the other control is a conditional-off control. The second randomization qubit acts as a control for the first and second CX gate, where one control is a conditional-on control and the other control is a conditional-off control. The third randomization qubit acts as a control for the third and fourth CX gate, where one control is a conditional-on control and the other control is a conditional-off control. The fourth randomization qubit acts as a control for the third and fourth CX gate, where one control is a conditional-on control and the other control is a conditional-off control.

As another example, in control pattern 512, the first randomization qubit and third randomization qubit act as controls for the first CX gate, where the first randomization qubit is a conditional-off control and the third randomization qubit is a conditional-on control. The first randomization qubit and third randomization qubit act as controls for the second CX gate, where the first randomization qubit is a conditional-on control and the third randomization qubit is a conditional-off control. The second randomization qubit and fourth randomization qubit act as controls for the third CX gate, where the second randomization qubit is a conditional-off control and the fourth randomization qubit is a conditional-on control. The second randomization qubit and fourth randomization qubit act as controls for the fourth CX gate, where the second randomization qubit is a conditional-on control and the fourth randomization qubit is a conditional-off control. In other words, the first randomization qubit acts as a control for the first and second CX gate, where one control is a conditional-on control and the other control is a conditional-off control. The second randomization qubit acts as a control for the third and fourth CX gate, where one control is a conditional-on control and the other control is a conditional-off control. The third randomization qubit acts as a control for the first and second CX gate, where one control is a conditional-on control and the other control is a conditional-off control. The fourth randomization qubit acts as a control for the third and fourth CX gate, where one control is a conditional-on control and the other control is a conditional-off control.

Figure 6:
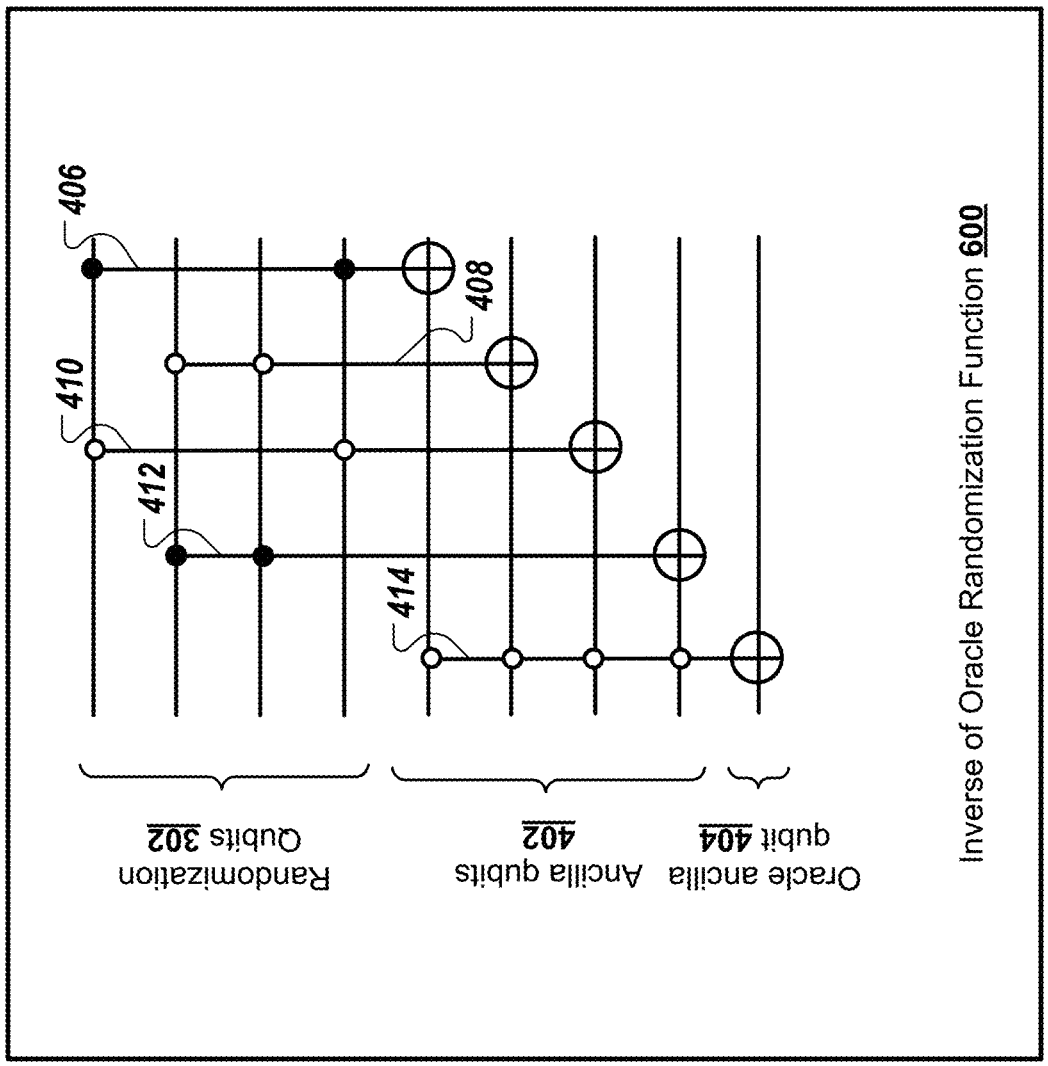
FIG. 6 shows an example quantum circuit for performing an inverse of an oracle randomization function.

FIG. 6 shows an example quantum circuit 600 for computing an inverse of the oracle randomization function computed by quantum circuit 400 of FIG. 4. The example quantum circuit 600 operates on the same qubit register as example quantum circuit 400 of FIG. 4, e.g., randomization qubits 302, ancilla qubits 402 and oracle ancilla qubit 404. The example quantum circuit 600 includes the same CX gates as those included in example quantum circuit 400, where the order of the CX gates is reversed. That is, example quantum circuit 600 includes the fifth CX gate 414, followed by the fourth CX gate 412, followed by the third CX gate 410, followed by the second CX gate 408, followed by the first CX gate 406.

Figure 7:
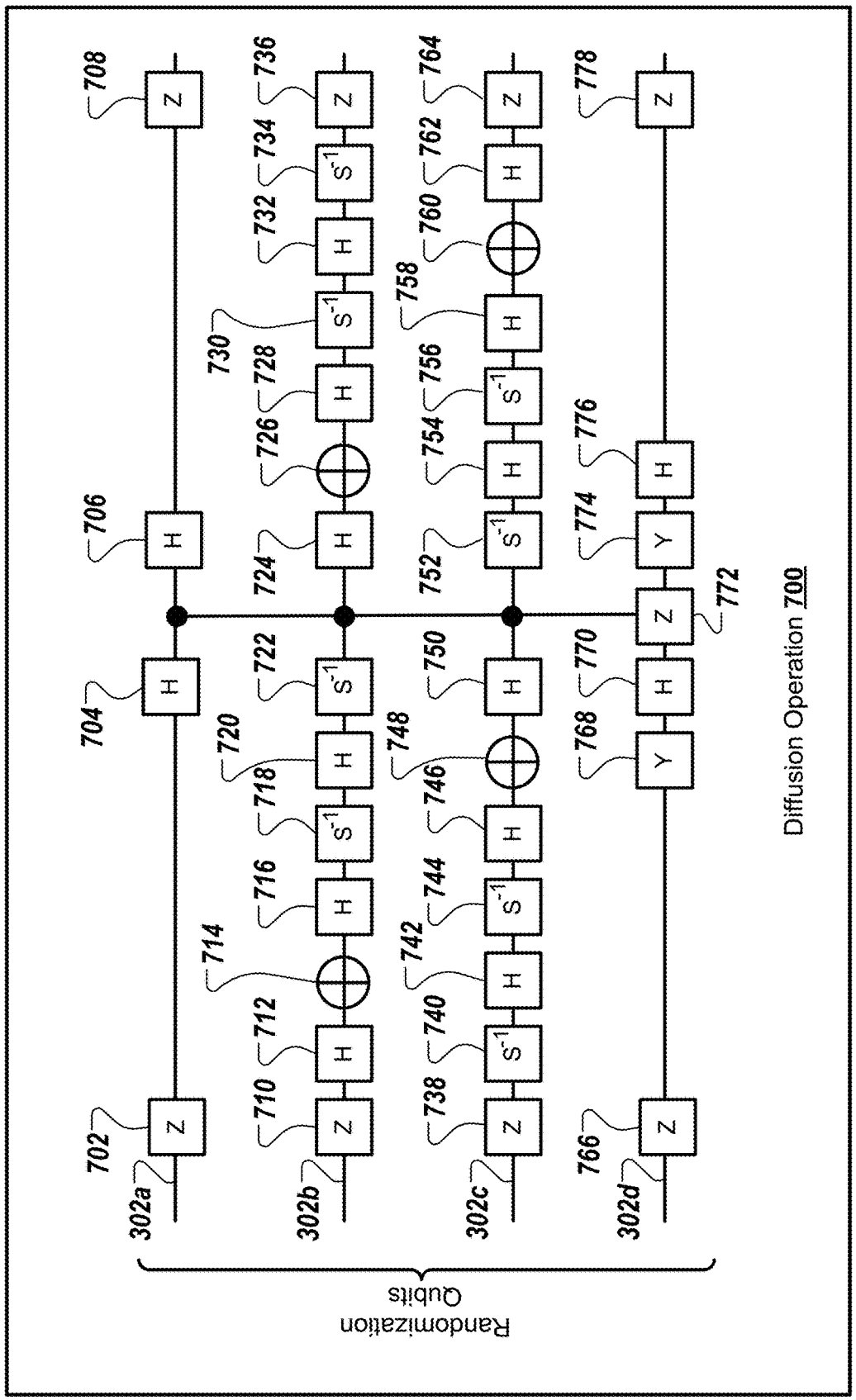
FIG. 7 shows an example quantum circuit for performing a diffusion operation.

FIG. 7 shows an example quantum circuit 700 for performing a diffusion operation on N=4 randomization qubits. The example quantum circuit 700 operates on four randomization qubits 302a, 302b, 302c and 302d. Prior to application of example quantum circuit 700, the randomization qubits 302a, 302b, 302c and 302d were initialized in the superposition states $|+\rangle$, $|-i\rangle$, $|i\rangle$, and $|-\rangle$ via application of quantum circuit 300 of FIG. 3, operated on by an oracle randomization function, e.g., via application of quantum circuit 400 of FIG. 4, and operated on by an inverse oracle randomization function, e.g., via application of quantum circuit 600 of FIG. 6 after implementation of an oracle phase flip operation.

The example quantum circuit 700 includes a Z gate 702, Hadamard gate 704, Hadamard gate 706 and Z gate 708 which are applied to the first randomization qubit 302a.

The example quantum circuit 700 further includes a Z gate 710, a Hadamard gate 712, a X gate 714, a Hadamard gate 716, an inverse S gate 718, a Hadamard gate 720 and an inverse S gate 722, a Hadamard gate 724, a X gate 726, a Hadamard gate 728, an inverse S gate 730, a Hadamard gate 732, an inverse S gate 734 and a Z gate 736 which are applied to the second randomization qubit 302b.

The example quantum circuit 700 further includes a Z gate 738, an inverse S gate 740, a Hadamard gate 742, an inverse S gate 744, a Hadamard gate 746, a X gate 748, a Hadamard gate 750, an inverse S gate 752, a Hadamard gate 754, an inverse S gate 756, a Hadamard gate 758, a X gate 760, a Hadamard gate 762 and a Z gate 764 which are applied to the third randomization qubit 302c.

The example quantum circuit 700 further includes a Z gate 766, a Y gate 768, Hadamard gate 770, a CZ gate 722, a Y gate 774, a Hadamard gate 776 and a Z gate 778 which are applied to the fourth randomization qubit 302d. Application of the CZ gate 772 is conditioned on: the first randomization qubit 302a being in an on state after application of Hadamard gate 704 and prior to application of Hadamard gate 706, the second randomization qubit 302b being in an on state after application of inverse S gate 722 and prior to application of Hadamard gate 724, and the third randomization qubit 302c being in an on state after application of Hadamard gate 750 and prior to application of inverse S gate 752.

Figure 8:
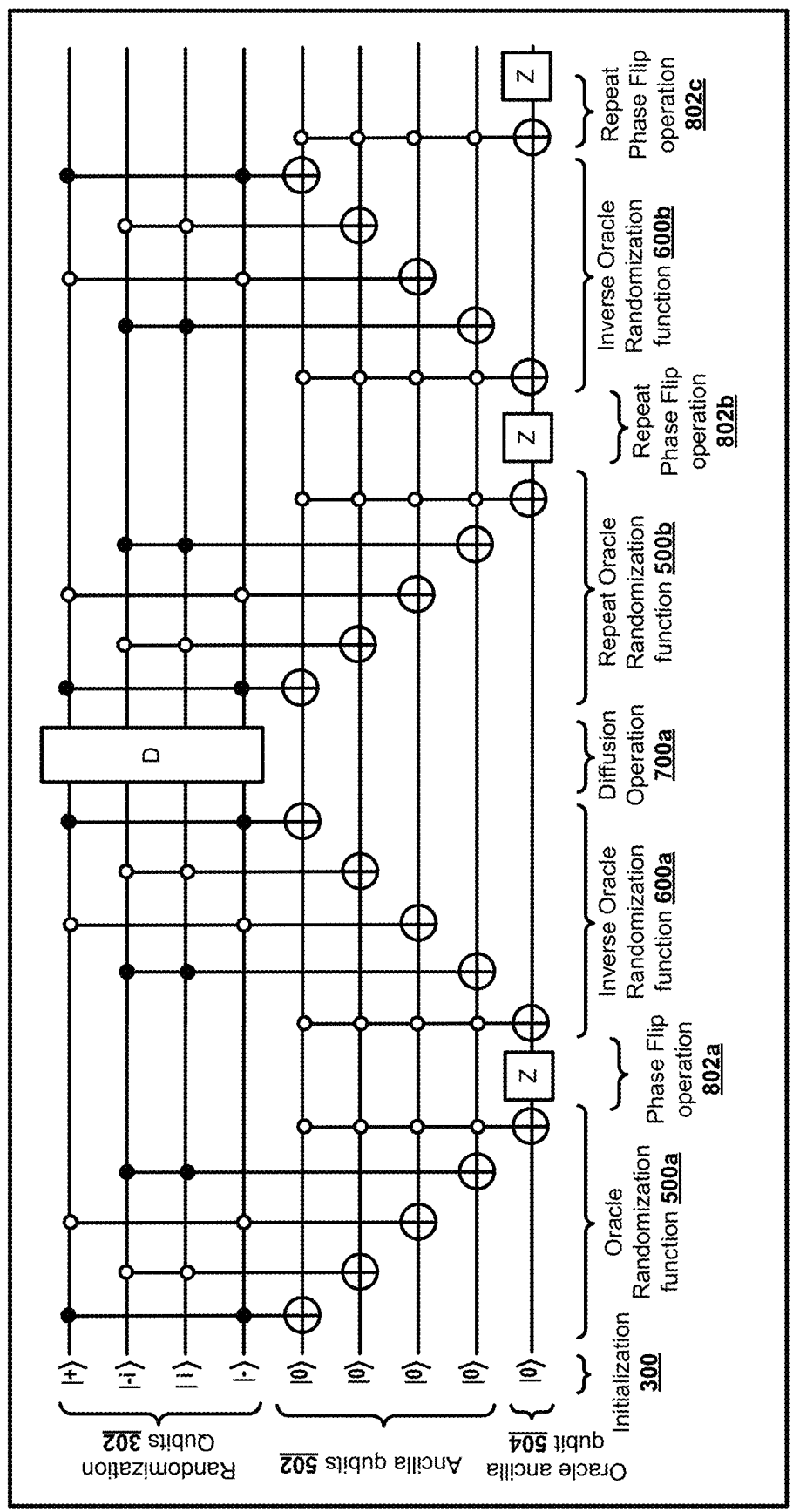
FIG. 8 shows an example quantum circuit for repeatedly performing steps 206-212 of example process 200 of FIG. 2.

FIG. 8 shows an example quantum circuit 800 corresponding to steps 202, 206-212 of example process 200, as described above with reference to FIG. 2. The example quantum circuit 800 operates on the four randomization qubits 302 of FIGS. 3-7, the four ancilla qubits 402 of FIGS. 4 and 6, and the oracle ancilla qubit 404 of FIGS. 4 and 6. In this example the randomization qubits 302 are initialized in the superposition quantum states $|+\rangle$, $|-i\rangle$, $|i\rangle$, and $|-\rangle$, e.g., via application of quantum circuit 300 of FIG. 3 and the multiple ancilla qubits 402 and oracle ancilla qubit are initially prepared in a zero state $|0\rangle$.

Because example quantum circuit 800 operates on four randomization qubits 302, the quantum circuit 800 includes $\sqrt{4}=2$ repetitions of steps 206-212 of example process 200. That is, the example quantum circuit 800 includes: operations 500a corresponding to a first computation of the oracle randomization function, as described above with reference to FIG. 5, a first phase flip operation 802a applied to the oracle ancilla qubit 404, operations 600a corresponding to a first uncomputation of the oracle randomization function, as described above with reference to FIG. 6, a diffusion operation 700a as described above with reference to FIG. 7, operations 500b corresponding to a second computation of the oracle randomization function, as described above with reference to FIG. 5, a second phase flip operation 802b applied to the oracle ancilla qubit 404, operations 600b corresponding to a second uncomputation of the oracle randomization function, as described above with reference to FIG. 6, a CX gate that targets the oracle ancilla qubit 404, where the ancilla qubits 402 act as conditional-off controls for the CX gate, and a third phase flip operation 802c applied to the oracle ancilla qubit 404.

Figure 9:
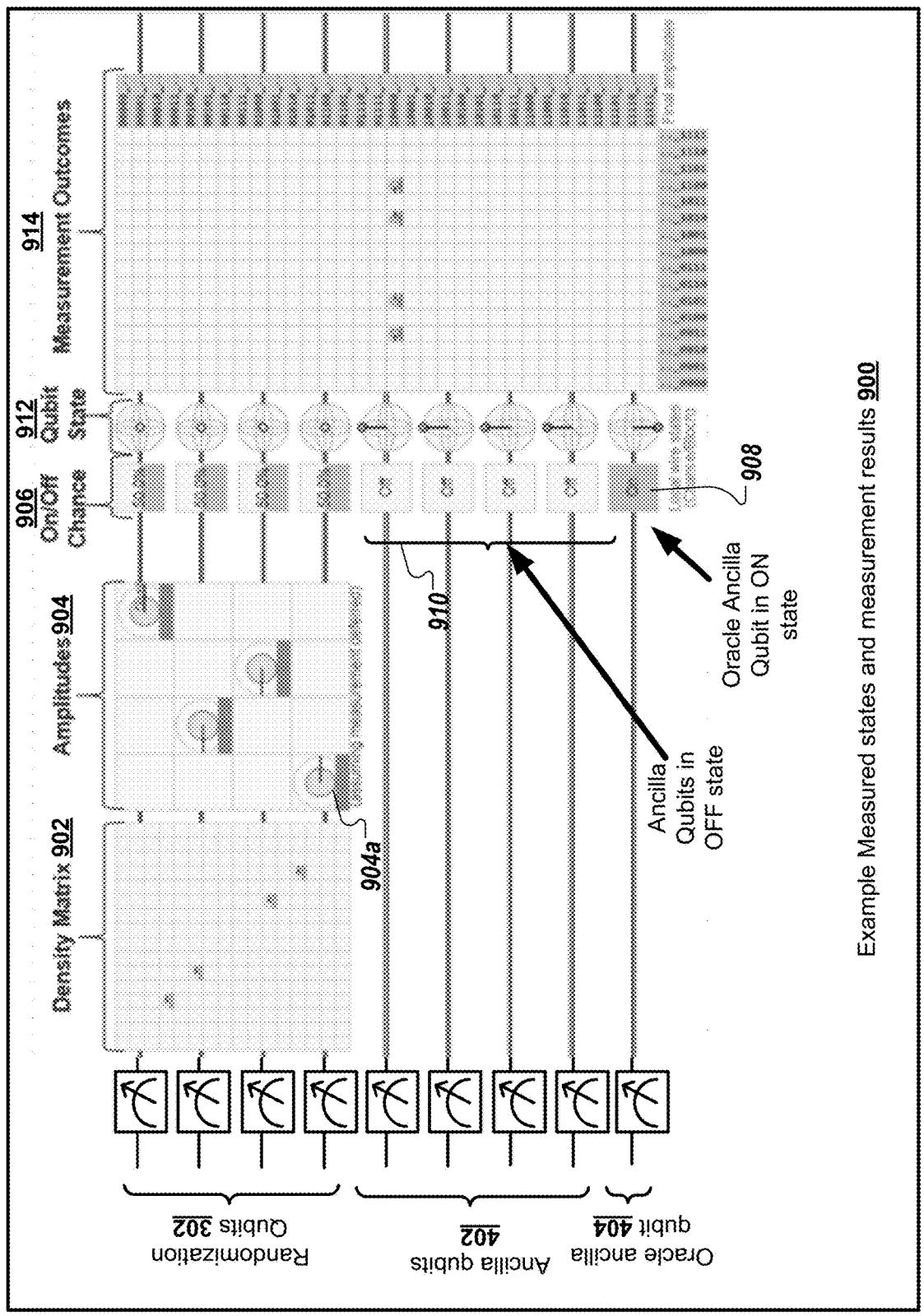
FIG. 9 shows example measurement statistics for measurement of randomization qubits, ancilla qubits and oracle ancilla qubit.

FIG. 9 shows example measurement statistics 900 for measurement of the randomization qubits 302, ancilla qubits 402 and oracle ancilla qubit 404, e.g., after application of example quantum circuit 800 of FIG. 8.

The example density matrix display 902 shows components of a density matrix representing measured states of the four randomization qubits 302. The four diagonal elements in the example density matrix display 902 represent the quantum states $|0011\rangle$, $|0101\rangle$, $|1010\rangle$ and $|1100\rangle$ described with reference to step 204, and therefore show the expected probability distribution associated with the oracle randomization function.

The example amplitudes 904 show quantum amplitudes of measured computational basis states of the randomization qubits 302. Each square represents a respective amplitude. The radius of the circles in the squares represent amplitude magnitude, and the angle of the black line indicator represents amplitude phase. The height of the filling in the squares represents a squared magnitude of the amplitude (its probability). For example, square 904a represents an amplitude of state $|1100\rangle$ where the amplitude has a value of $0.5+0.0i$, a magnitude of 25.0% and a 0.0 degree phase.

The example probabilities 906 show that there was a 50% chance that measurement of the randomization qubits output an eigenvalue corresponding to the zero state and a 50% chance that measurement of the randomization qubits output an eigenvalue corresponding to the one state. The example probabilities further show that the ancilla qubits 402 were measured in off states 910 and the oracle ancilla qubit 404 were measured in an on state 908.

The qubit state representations 912 show Bloch vector representations of the state of each randomization qubit. For example, the qubit state representations 912 show that the randomization qubits 302 are in completely mixed states, the ancilla qubits 402 are in off states and the oracle ancilla qubit 404 is in an on state.

The measurement outcomes 914 shows the final expected measurement outcomes of all qubits. With no errors/tampering/faults there are only four outcomes, each with a 25% probability chance. If there were a final measurement outcome with a probability 0%, this would indicate an error and the result would be discarded.

Figure 10:
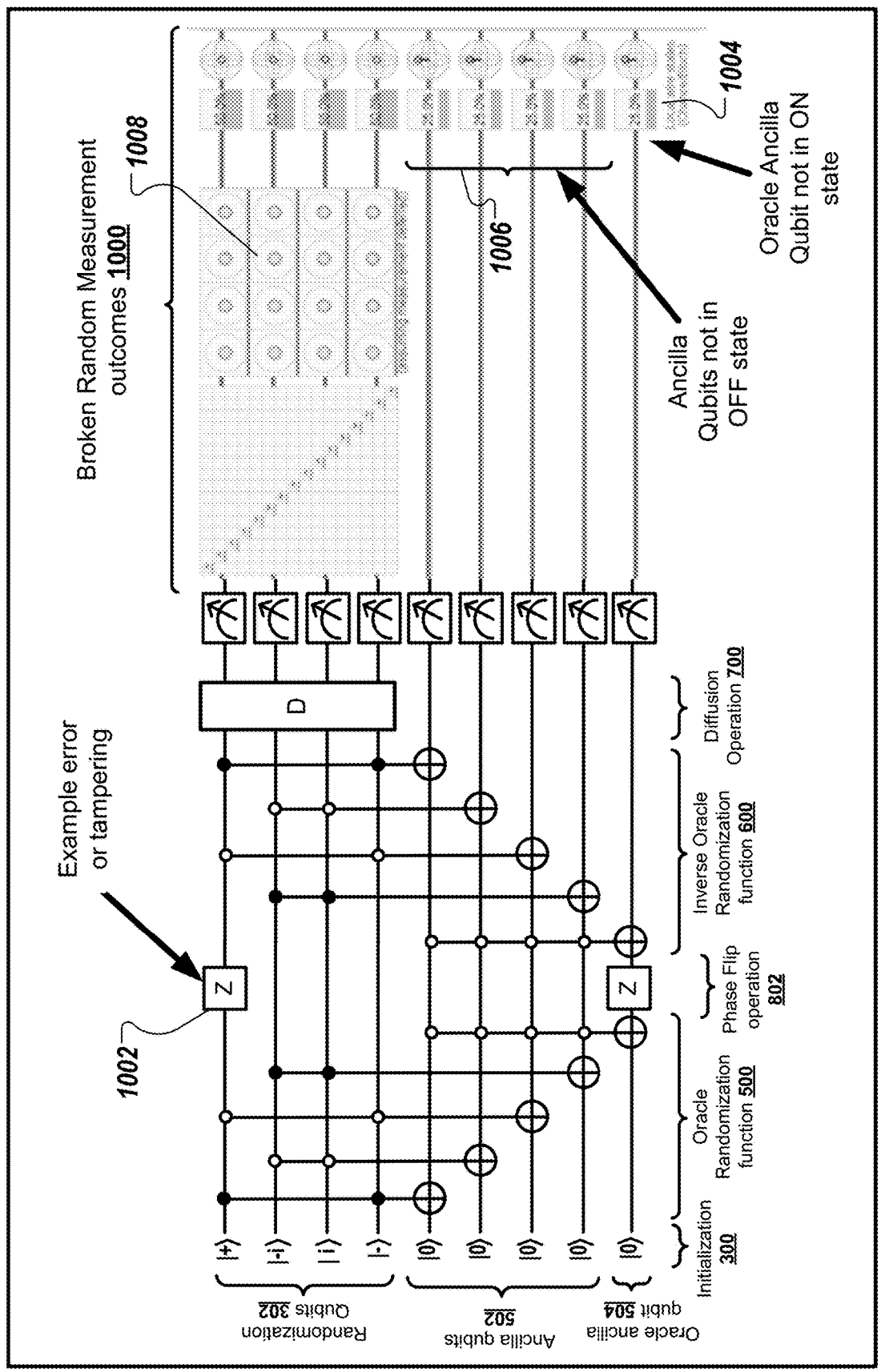
FIG. 10 shows example measurement statistics for measurement of randomization qubits, ancilla qubits and oracle ancilla qubit in the presence of an error or malicious tampering.

FIG. 10 shows example measurement statistics 1000 for measurement of the randomization qubits 302, ancilla qubits 402 and oracle ancilla qubit 404, e.g., after application of example quantum circuit 800 of FIG. 8, in the presence of an error or malicious tampering. In this example, the error or malicious tampering includes application of a Pauli-Z gate 1002 to the first randomization qubit.

Because of the application of the Pauli-Z gate 1002, the corresponding measurement statistics 1000 are "broken" and indicate that an error or tampering occurred. For example, the measurement outcomes 1006 show that each ancilla qubit 402 was not always measured in an off state. Instead, there was a 25% chance that the ancilla qubits 402 were measured in an off state. Similarly, the example measurement outcomes 1004 show that the oracle ancilla qubit 404 was not always in an on state. Instead, there was a 25% chance that the oracle ancilla qubit was in an off state. In addition, the example measurement outcomes 1008 show that the measured amplitudes of the randomization qubit output states do not match the expected probability distribution. Instead, each possible output state was output with equal probability.

Figure 11:
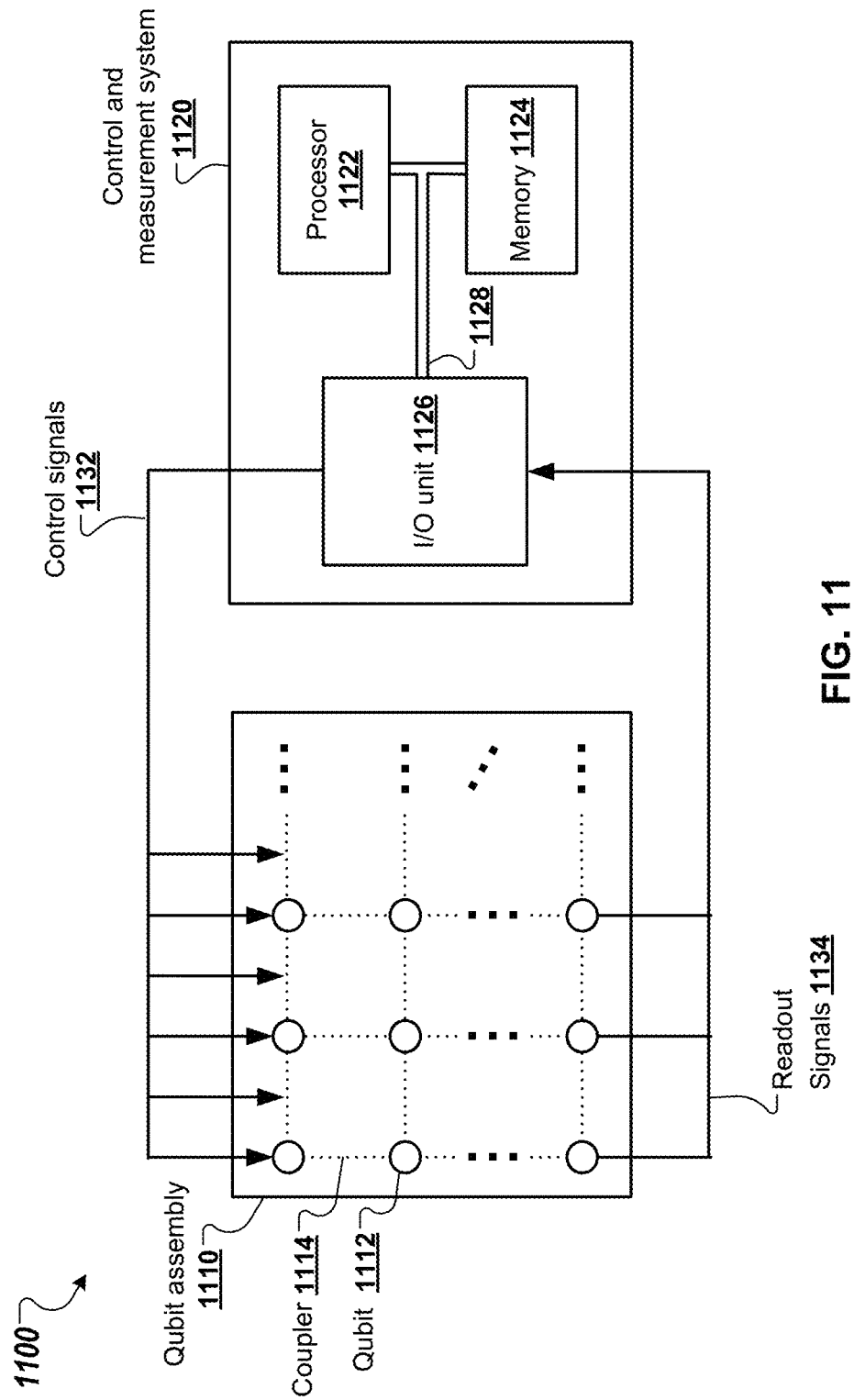
FIG. 11 shows an example quantum computing device that may be used to carry out the quantum computing methods described herein.

FIG. 11 is a block diagram of an example quantum computing device 1100. The quantum computing device 1100 can be used to perform the quantum computation operations described in this specification according to some implementations. The quantum computing device 1100 is intended to represent various forms of quantum computing devices. The components shown here, their connections and relationships, and their functions, are exemplary only, and do not limit implementations of the inventions described and/or claimed in this document.

The quantum computing device 1100 includes a qubit assembly 1110 and a control and measurement system 1120. The qubit assembly includes multiple qubits, e.g., qubit 1112, that are used to perform algorithmic operations or quantum computations. While the qubits shown in FIG. 11 are arranged in a rectangular array, this is a schematic depiction and is not intended to be limiting. The qubit assembly 1110 also includes adjustable coupling elements, e.g., coupler 1114, that allow for interactions between coupled qubits. In the schematic depiction of FIG. 11, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a two-level quantum system or device having levels representing logical values of 0 and 1. The specific physical realization of the multiple qubits and how they interact with one another is dependent on a variety of factors including the type of the quantum computing device 1100 or the type of quantum computations that the quantum computing device 1100 is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by initializing the qubits in a selected initial state and applying a sequence of quantum logic gates to the qubits. Example quantum logic gates include single-qubit gates, e.g., Pauli-X, Pauli-Y, Pauli-Z gates (also referred to as X, Y, Z gates), Hadamard gates, S gates and inverses thereof, and multi-qubit gates, e.g., controlled Pauli-X, controlled Pauli-Y, controlled Pauli-Z gates (also referred to as controlled X, controlled Y, controlled Z or CX, CY, CZ gates). The quantum logic gates can be implemented by applying control signals 1132 generated by the control and measurement system 1120 to the qubits and to the couplers.

For example, in some implementations the qubits in the qubit assembly 1110 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 1132 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as Z, using respective control signals 1134. The measurements cause readout signals 1134 representing measurement results to be communicated back to the measurement and control system 1120. The readout signals 1134 may include RF, microwave, or optical signals depending on the physical scheme for the quantum computing device 1100 and/or the qubits. For convenience, the control signals 1132 and readout signals 1134 shown in FIG. 11 are depicted as addressing only selected elements of the qubit assembly (i.e. the top and bottom rows), but during operation the control signals 1132 and readout signals 1134 can address each element in the qubit assembly 1110.

The control and measurement system 1120 is an example of a classical computer system that can be used to perform various operations on the qubit assembly 1110, as described above. The control and measurement system 1120 includes one or more classical processors, e.g., classical processor 1122, one or more memories, e.g., memory 1124, and one or more I/O units, e.g., I/O unit 1126, connected by one or more data buses, e.g., bus 1126. The control and measurement system 1120 can be programmed to send sequences of control signals 1132 to the qubit assembly, e.g. to carry out a selected series of quantum gate operations, and to receive sequences of readout signals 1134 from the qubit assembly, e.g. as part of performing measurement operations.

The processor 1122 is configured to process instructions for execution within the control and measurement system 1120. In some implementations, the processor 1122 is a single-threaded processor. In other implementations, the processor 1122 is a multi-threaded processor. The processor 1122 is capable of processing instructions stored in the memory 1124.

The memory 1124 stores information within the control and measurement system 1120. In some implementations, the memory 1124 includes a computer-readable medium, a volatile memory unit, and/or a non-volatile memory unit. In some cases, the memory 1124 can include storage devices capable of providing mass storage for the system 1120, e.g. a hard disk device, an optical disk device, a storage device that is shared over a network by multiple computing devices (e.g., a cloud storage device), and/or some other large capacity storage device.

The input/output device 1126 provides input/output operations for the control and measurement system 1120. The input/output device 1126 can include D/A converters, A/D converters, and RF/microwave/optical signal generators, transmitters, and receivers, whereby to send control signals 1132 to and receive readout signals 1134 from the qubit assembly, as appropriate for the physical scheme for the quantum computer. In some implementations, the input/output device 1126 can also include one or more network interface devices, e.g., an Ethernet card, a serial communication device, e.g., an RS-232 port, and/or a wireless interface device, e.g., an 802.11 card. In some implementations, the input/output device 1126 can include driver devices configured to receive input data and send output data to other external devices, e.g., keyboard, printer and display devices.

Although an example control and measurement system 1120 has been depicted in FIG. 11, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Figure 12:
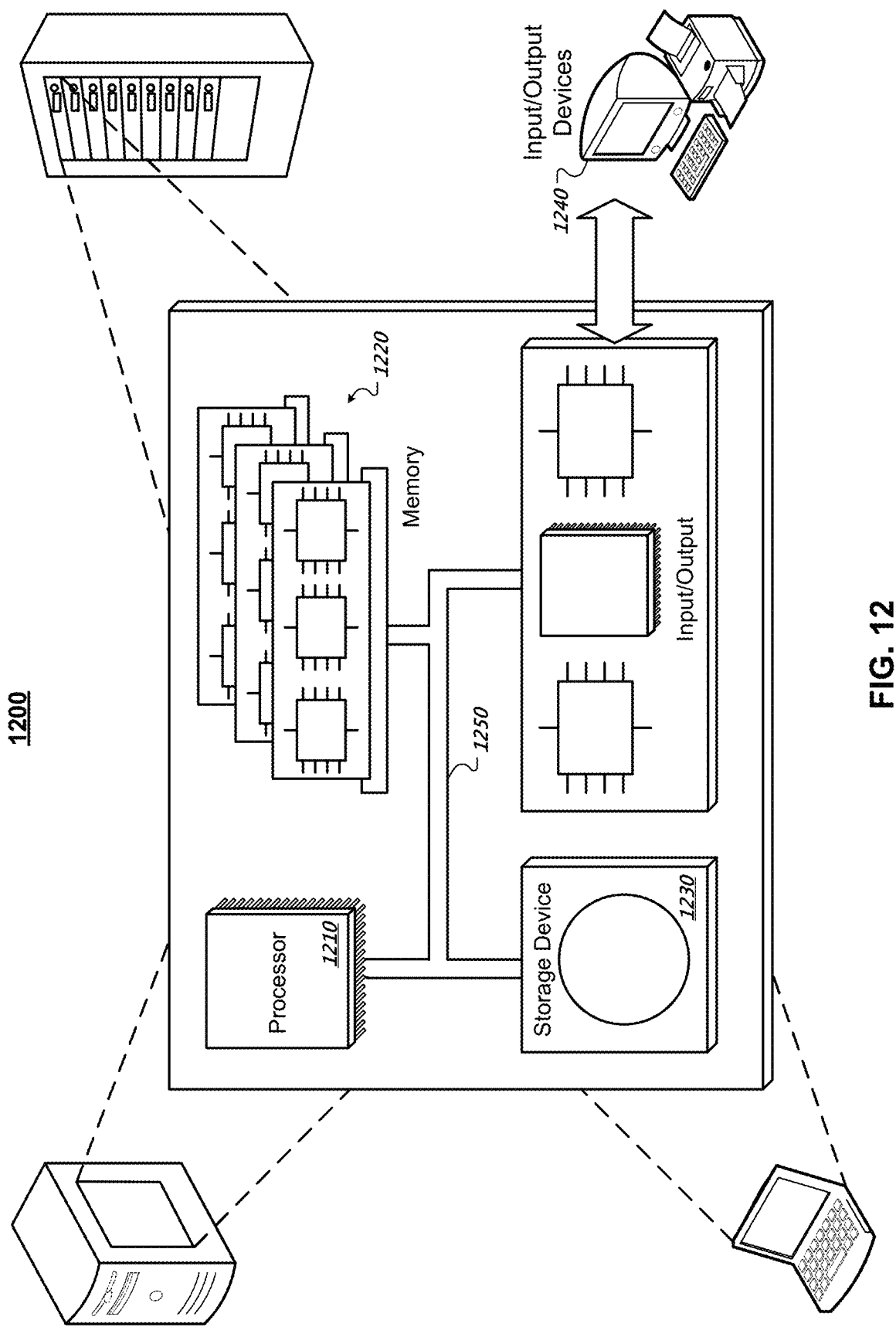
FIG. 12 shows an example classical processor that may be used to carry out the classical computing methods described herein.

FIG. 12 illustrates a schematic diagram of an exemplary generic classical processor system 1200. The system 1200 can be used for the classical operations described in this specification according to some implementations. The system 1200 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 1200 includes a processor 1210, a memory 1220, a storage device 1230, and an input/output device 1240. Each of the components 1210, 1220, 1230, and 1220 are interconnected using a system bus 1250. The processor 1210 may be enabled for processing instructions for execution within the system 1200. In one implementation, the processor 1210 is a single-threaded processor. In another implementation, the processor 1210 is a multi-threaded processor. The processor 1210 may be enabled for processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 may be enabled for providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    initializing N qubits in respective superposition states;
    computing a randomly selected oracle randomization function using i) the initialized N qubits and ii) multiple ancilla qubits, wherein the multiple ancilla qubits comprise a first ancilla qubit and one or more second ancilla qubits;
    performing a phase flip operation on the first ancilla qubit;
    computing an inverse of the randomly selected oracle randomization function using i) the N qubits and ii) the multiple ancilla qubits;
    performing a diffusion operation on the N qubits; and
    measuring the N qubits and providing data representing measured states of the N qubits as N random bits.

2. The method of claim 1, further comprising:
    measuring the multiple ancilla qubits to obtain respective measurement results; and
    classically post processing the measurement results, comprising:
        determining whether i) a measured state of the first ancilla qubit comprises an on state and ii) measured states of the second ancilla qubits each comprise an off state; and
        in response to determining that i) a measured state of the first ancilla qubit comprises an on state and ii) measured states of the other ancilla qubits each comprise an off state, providing the data representing the measured states of the N qubits as N random bits.

3. The method of claim 1, further comprising
repeatedly: initializing the N qubits in respective superposition states, computing a randomly selected oracle randomization function, performing a phase flip operation on the first ancilla qubit, computing an inverse of the randomly selected oracle randomization function, and measuring the N qubits and ancilla qubits to obtain measurement statistics for the N qubits and the multiple ancilla qubits; and
classically post processing the measurement statistics, comprising:
  determining whether i) each measured state of the first ancilla qubit comprises an on state, ii) each measured state of the second ancilla qubits comprises an off state, and iii) the measurement outcomes of the N qubits match an expected probability distribution of the oracle randomization function; and
  in response to determining that i) each measured state of the first ancilla qubit comprises an on state, ii) each measured state of the other ancilla qubits comprises an off state, and iii) measurement outcomes of the N qubits match an expected probability distribution of the oracle randomization function, providing i) data representing measured states of the N qubits for one repetition as N random bits or ii) generating a random N bit output by performing randomness extraction on the measurement statistics.

4. The method of claim 3, wherein performing randomness extraction on the measurement statistics comprises computing inner products of randomization qubit measurement results over pairs of output states for different repetitions.

5. The method of claim 1, wherein the superposition states comprise uniform superposition states, e.g., $|+\rangle$, $|-\rangle$, $|i\rangle$, or $|-i\rangle$ states.

6. The method of claim 1, wherein the superposition states comprise a balanced distribution of superposition states.

7. The method of claim 1, wherein initializing the N qubits in respective superposition states comprises initializing one or more qubits in a $-i$ state, wherein initializing a qubit in a $-i$ state comprises:
  preparing the qubit in a zero computational state; and
  applying a sequence of quantum logic gates to the qubit in the zero computational state, the sequence of quantum logic gates comprising a first Hadamard gate, a X gate, a second Hadamard gate, a first inverse S gate, a third Hadamard gate and a second inverse S gate.

8. The method of claim 1, wherein initializing the N qubits in respective superposition states comprises initializing one or more qubits in an i state, wherein initializing a qubit in an i state comprises:
  preparing the qubit in a zero computational state; and
  applying a sequence of quantum logic gates to the qubit in the zero computational state, the sequence of quantum logic gates comprising a first inverse S gate, a first Hadamard gate, a second inverse S gate, a second Hadamard gate, a X gate and a third Hadamard gate.

9. The method of claim 1, further comprising implementing an error correction routine on the N qubits using one or more ancilla qubits.

10. The method of claim 1, wherein i) the oracle randomization function prepares the N-qubits in a mixed quantum state and ii) measuring the mixed quantum state outputs multiple pure quantum states according to an associated expected probability distribution.

11. The method of claim 1, further comprising randomly selecting the oracle randomization function from a set of multiple oracle randomization functions, wherein i) each oracle randomization function in the set of multiple oracle randomization functions prepares the N-qubits in a respective mixed quantum state and ii) measuring each mixed quantum state outputs multiple pure quantum states according to a respective expected probability distribution.

12. The method of claim 11, wherein the set of multiple oracle randomization functions excludes oracle randomization functions that prepare each of the N-qubits in a 0 quantum state or each of the N-qubits in a 1 quantum state.

13. The method of claim 1, wherein the oracle randomization function comprises:
  multiple CX gates, wherein i) each CX gate targets a respective second ancilla qubit, ii) two of the N qubits act as controls for each CX gate, and iii) each of the N qubits acts as a control for two respective CX gates, wherein a first control comprises a conditional-on control and a second control comprises a conditional-off control; and
  a CX gate targeting the first ancilla qubit, wherein i) each second ancilla qubit acts as a control for the CX gate and ii) the controls for the CX gate comprise conditional-off controls.

14. The method of claim 1, wherein computing the randomly selected oracle randomization function using i) the initialized N qubits and ii) the multiple ancilla qubits comprises:
  applying, conditioned on a first qubit of the N qubits being in a zero state and a fourth qubit of the N qubits being in a zero state, a first X gate to a first qubit of the one or more second ancilla qubits;
  applying, conditioned on a second qubit of the N qubits being in a one state and a third qubit of the N qubits being in a one state, a second X gate to a second qubit of the one or more second ancilla qubits;
  applying, conditioned on the first qubit of the N qubits being in a one state and the fourth qubit of the N qubits being in a one state, a third X gate to a third qubit of the one or more second ancilla qubits;
  applying, conditioned on the second qubit of the N qubits being in a zero state and the third qubit of the N qubits being in a zero state, a fourth X gate to a fourth qubit of the one or more second ancilla qubits; and
  applying, conditioned on each of the first, second, third and fourth qubits of the N qubits being in a one state, a fifth X gate to the first ancilla qubit.

15. The method of claim 1, wherein performing the phase flip operation on the first ancilla qubit comprises applying a Z gate to the first ancilla qubit.

16. The method of claim 1, wherein performing the diffusion operation on the N qubits negates the initialization of the N qubits in the respective superposition states.

17. The method of claim 1, wherein initializing the N qubits in respective superposition states comprises applying respective sequences of quantum gates to the N qubits, and wherein performing the diffusion operation on the N qubits comprises:
  applying a Z gate to each of the N qubits;
  applying the respective sequences of quantum gates to the N qubits;
  applying a Z gate to one of the N qubits, wherein the Z gate is conditioned on each other qubit in the N qubits being in a zero state;
  applying the respective sequences of quantum gates to the N qubits; and
  applying a Z gate to each of the N qubits.

18. The method of claim 1, further comprising repeatedly i) computing a randomly selected oracle randomization function using the initialized N qubits and multiple ancilla qubits, ii) performing a phase flip operation on the first ancilla qubit, iii) computing an inverse of the randomly selected oracle randomization function using the N qubits and the multiple ancilla qubits, and iv) performing a diffusion operation on the N qubits for a predetermined number of times, wherein the predetermined number of times comprises an integer part of $\sqrt{N}$.

19. The method of claim 1, further comprising repeatedly i) initializing the N qubits in respective superposition states, ii) computing a randomly selected oracle randomization function, iii) performing a phase flip operation on the first ancilla qubit, iv) computing an inverse of the randomly selected oracle randomization function, v) performing a diffusion operation on the N qubits, and vi) measuring the N qubits and providing data representing the measured states of the N qubits as N random bits, to output a stream of random bits.

20. A system comprising:
one or more classical processors; and
quantum computing hardware;
wherein the system is configured to perform operations comprising:
initializing N qubits in respective superposition states;
computing a randomly selected oracle randomization function using i) the initialized N qubits and ii) multiple ancilla qubits, wherein the multiple ancilla qubits comprise a first ancilla qubit and one or more second ancilla qubits;
performing a phase flip operation on the first ancilla qubit;
computing an inverse of the randomly selected oracle randomization function using i) the N qubits and ii) the multiple ancilla qubits;
performing a diffusion operation on the N qubits; and
measuring the N qubits and providing data representing the measured states of the N qubits as N random bits.

* * * * *